United States Patent
Park et al.

(10) Patent No.: US 9,357,536 B2
(45) Date of Patent: May 31, 2016

(54) METHOD AND APPARATUS OF CONTROLLING CELL DEACTIVATION IN A WIRELESS COMMUNICATION SYSTEM

(71) Applicant: LG ELECTRONICS INC., Seoul (KR)

(72) Inventors: Sungjun Park, Anyang-si (KR); Seungjune Yi, Anyang-si (KR); Youngdae Lee, Anyang-si (KR); Sunghoon Jung, Anyang-si (KR); Sunyoung Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/385,446

(22) PCT Filed: May 6, 2013

(86) PCT No.: PCT/KR2013/003900
§ 371 (c)(1),
(2) Date: Sep. 15, 2014

(87) PCT Pub. No.: WO2013/168938
PCT Pub. Date: Nov. 14, 2013

(65) Prior Publication Data
US 2015/0049753 A1    Feb. 19, 2015

Related U.S. Application Data

(60) Provisional application No. 61/645,603, filed on May 10, 2012.

(51) Int. Cl.
*H04W 72/04* (2009.01)
*H04J 11/00* (2006.01)
*H04W 56/00* (2009.01)

(52) U.S. Cl.
CPC ......... *H04W 72/0413* (2013.01); *H04J 11/005* (2013.01); *H04W 56/0045* (2013.01)

(58) Field of Classification Search
None
See application file for complete search history.

(56) References Cited

U.S. PATENT DOCUMENTS

| | | | |
|---|---|---|---|
| 2012/0257569 A1* | 10/2012 | Jang | H04L 5/001 370/328 |
| 2013/0114574 A1* | 5/2013 | Ng | H04W 56/0045 370/336 |
| 2013/0258882 A1* | 10/2013 | Dinan | H04W 56/001 370/252 |
| 2015/0049739 A1* | 2/2015 | Lee | H04W 56/0045 370/336 |

OTHER PUBLICATIONS

Ericsson, et al., "Group management for multiple TA," 3GPP TSG-RAN WG2 #75bis, Tdoc R2-115061, Oct. 2011, 3 pages.

(Continued)

*Primary Examiner* — Mohammad Adhami
(74) *Attorney, Agent, or Firm* — Lee Hong Degerman Kang & Waimey; Jonathan Kang; Jeffrey Lotspeich

(57) ABSTRACT

The present invention is directed to a wireless communication system. Specifically, the present invention is directed to a method of receiving information at a user equipment configured with a serving cell in a mobile communication system, and the method comprises activating the serving cell; receiving a first signal from a base station, the first signal including timing advance group assignment information for the serving cell; and deactivating the serving cell if the timing advance group assignment information indicates a second timing advance group different from a first timing advance group assigned to the serving cell.

6 Claims, 13 Drawing Sheets

(56) References Cited

OTHER PUBLICATIONS

Sharp, "Remaining issues of TA group handling," 3GPP TSG-RAN WG2 #77bis, R2-121384, Mar. 2012, 4 pages.
Ericsson, et al., "Random Access Failure Handling on SCell," 3GPP TSG-RAN WG2 #77bis, Tdoc R2-121449, 5 pages.
Pantech, "Validity of TA value for SCell with deactivation," 3GPP TSG RAN WG2 Meeting #75bis, R2-115184, Oct. 2011, 4 pages.
ITRI, "Deactivation of Timing Reference SCell in sTAG," 3GPP TSG-RAN WG2 Meeting #77bis, Tdoc R2-121530, Mar. 2012, 4 pages.
PCT International Application No. PCT/KR2013/003900, Written Opinion of the International Searching Authority dated Aug. 28, 2013, 1 page.

* cited by examiner

METHOD AND APPARATUS OF CONTROLLING CELL DEACTIVATION IN A WIRELESS COMMUNICATION SYSTEM

CROSS-REFERENCE TO RELATED APPLICATIONS

This application is the National Stage filing under 35 U.S.C. 371 of International Application No. PCT/KR2013/003900, filed on May 6, 2013, which claims the benefit of U.S. Provisional Application Ser. No. 61/645,603, filed on May 10, 2012, the contents of which are hereby incorporated by reference herein in their entirety.

TECHNICAL FIELD

The present invention is directed to a wireless communication system. Specifically, the present invention is directed to a method and apparatus of controlling cell deactivation in a wireless communication system supporting carrier aggregation (CA).

BACKGROUND ART

A wireless communication system is developing to diversely cover a wide range to provide various communication services such as an audio communication service, a data communication service and the like. The wireless communication is a sort of a multiple access system capable of supporting communications with multiple users by sharing available system resources (e.g., bandwidth, transmit power, etc.). For example, the multiple access system may include one of a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

DISCLOSURE OF INVENTION

Technical Problem

An objective of the present invention is to provide a method and apparatus of efficiently controlling cell deactivation in a wireless communication system.

Another objective of the present invention is to provide a method and apparatus for efficiently preventing cell interferences when re-assigning timing advance information to a serving cell.

It will be appreciated by persons skilled in the art that the objectives that can be achieved through the present invention are not limited to what has been particularly described hereinabove and the above and other objectives that the present invention can achieve will be more clearly understood from the following detailed description taken in conjunction with the accompanying drawings.

Solution to Problem

As an aspect of the present invention, a method of receiving information at a user equipment configured with a serving cell in a mobile communication system is provided, and the method comprises activating the serving cell; receiving a first signal from a base station, the first signal including timing advance group assignment information for the serving cell; and deactivating the serving cell if the timing advance group assignment information indicates a second timing advance group different from a first timing advance group assigned to the serving cell.

Preferably, the first signal may be received via radio resource control (RRC) signaling or medium access control (MAC) signaling.

Preferably, the timing advance group assignment information may include a serving cell identifier and a timing advance group identifier.

Preferably, the deactivating of the serving cell may be performed if the serving cell identifier included in the timing advance group assignment information is same as a serving cell identifier of the serving cell and if the timing advance group identifier included in the timing advance group assignment information is different from a timing advance group identifier of the serving cell.

Preferably, the serving cell may be a secondary cell.

Preferably, the deactivating of the serving cell may be performed when the second timing advance group is equal to a pre-defined timing advance group.

As an another aspect of the present invention, a user equipment (UE) configured with a serving cell in a mobile communication system is provided, and the UE comprises a radio frequency (RF) unit; and a processor, wherein the processor is configured to activate the serving cell, receive a first signal from a base station, the first signal including timing advance group assignment information for the serving cell, and deactivate the serving cell if the timing advance group assignment information indicates a second timing advance group different from a first timing advance group assigned to the serving cell.

Preferably, the first signal may be received via radio resource control (RRC) signaling or medium access control (MAC) signaling.

Preferably, the timing advance group assignment information may include a serving cell identifier and a timing advance group identifier.

Preferably, the deactivating of the serving cell may be performed if the serving cell identifier included in the timing advance group assignment information is same as a serving cell identifier of the serving cell and if the timing advance group identifier included in the timing advance group assignment information is different from a timing advance group identifier of the serving cell.

Preferably, the serving cell may be a secondary cell.

Preferably, the deactivating of the serving cell may be performed when the second timing advance group is equal to a pre-defined timing advance group.

Advantageous Effects of Invention

In accordance with the embodiments of the present invention, cell deactivation can be efficiently controlled in a wireless communication system.

In accordance with the embodiments of the present invention, cell interferences can be efficiently prevented when re-assigning timing advance information to a serving cell.

It will be appreciated by persons skilled in the art that the effects that can be achieved through the present invention are not limited to what has been particularly described above and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

MODE FOR THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the present invention. The following embodiments of the present invention can be applied to a variety of wireless access technologies, for example, CDMA, FDMA, TDMA, OFDMA, SC-FDMA, MCFDMA, and the like. CDMA can be implemented by wireless communication technologies, such as universal terrestrial radio access (UTRA) or CDMA2000. TDMA can be implemented by wireless communication technologies, for example, global system for mobile communications (GSM), general packet radio service (GPRS), enhanced data rates for GSM evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the universal mobile telecommunications system (UMTS). 3rd generation partnership project (3GPP) long term evolution (LTE) is a part of evolved UMTS (E-UMTS) that uses E-UTRA. The LTE Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the embodiments of the present invention will be described hereinafter on the basis of the 3GPP LTE/LTE-A system, it should be noted that the embodiments are only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
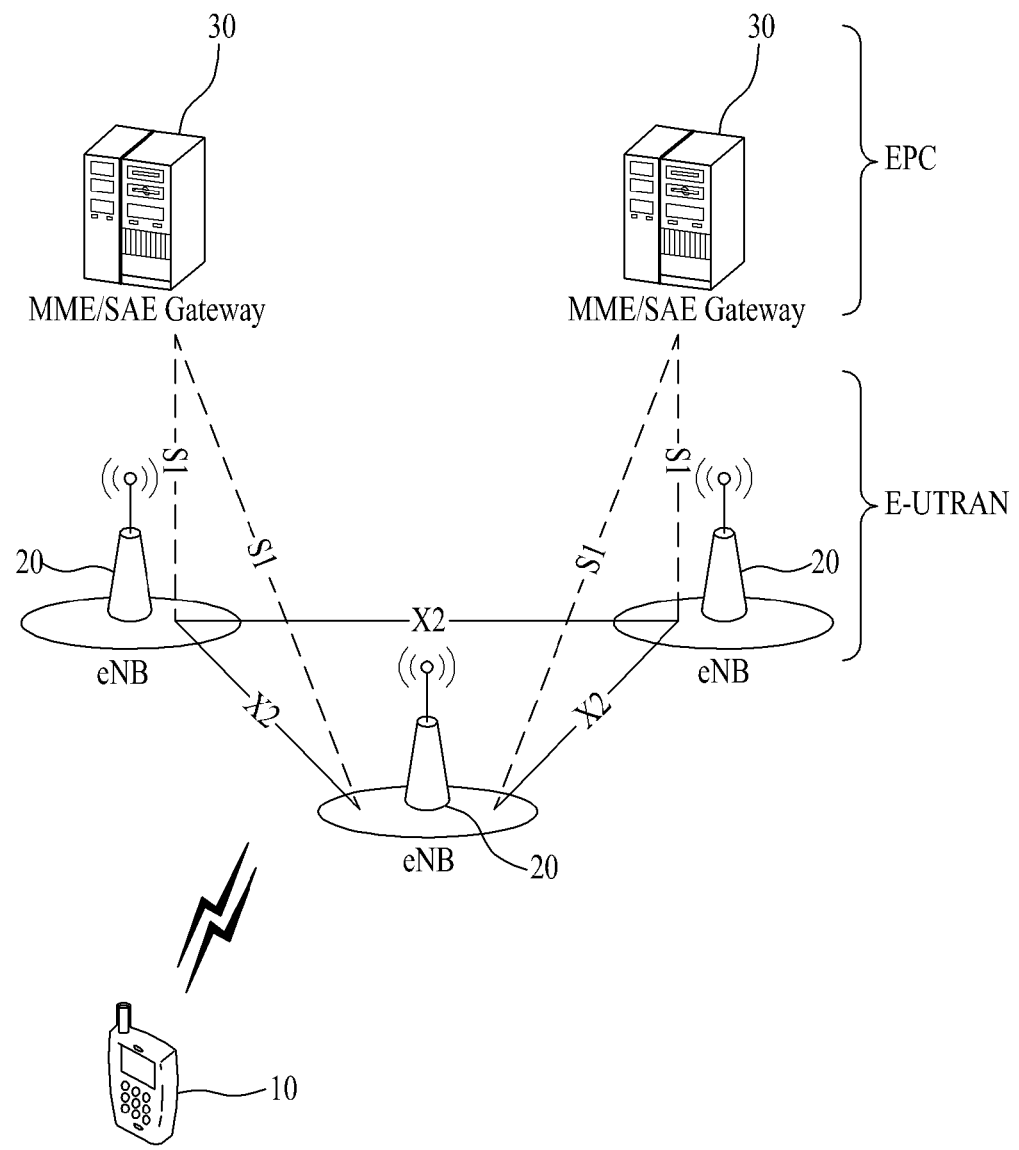
FIG. 1 illustrates an exemplary network structure of an E-UMTS.

FIG. 1 illustrates an exemplary network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with reference to later figures.

With reference to FIG. 1, the E-UMTS network includes an evolved UMTS terrestrial radio access network (E-UTRAN), an evolved packet core (EPC), and one or more mobile terminals (or user equipment (UE)) 10. The E-UTRAN includes one or more eNodeBs (eNBs) 20. Regarding the EPC, mobility management entity/system architecture evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a mobile station (MS), a user terminal (UT), a subscriber station (SS) or a wireless device. In general, the UE includes a radio frequency (RF) unit and a processor, among other components, and is configured to operate in accordance with the various techniques presented herein.

The eNB 20 is generally a fixed station that communicates with the UE 10. In addition, the eNB 20 is referred to as a base station or an access point. An eNB 20 provides end points of a user plane and a control plane to the UE 10. In general, the eNB includes a Radio Frequency (RF) unit and a processor, among other components, and is configured to operate in accordance with the various techniques presented herein.

In terms of geometric view, a plurality of UEs 10 may be located in one cell. One eNB 20 is typically deployed per cell. An interface for transmitting user traffic or control traffic may be used between eNBs 20. Here, "downlink (DL)" refers to communication from the eNB 20 to the UE 10, and "uplink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of user plane packets for paging reasons, and switching of the user plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
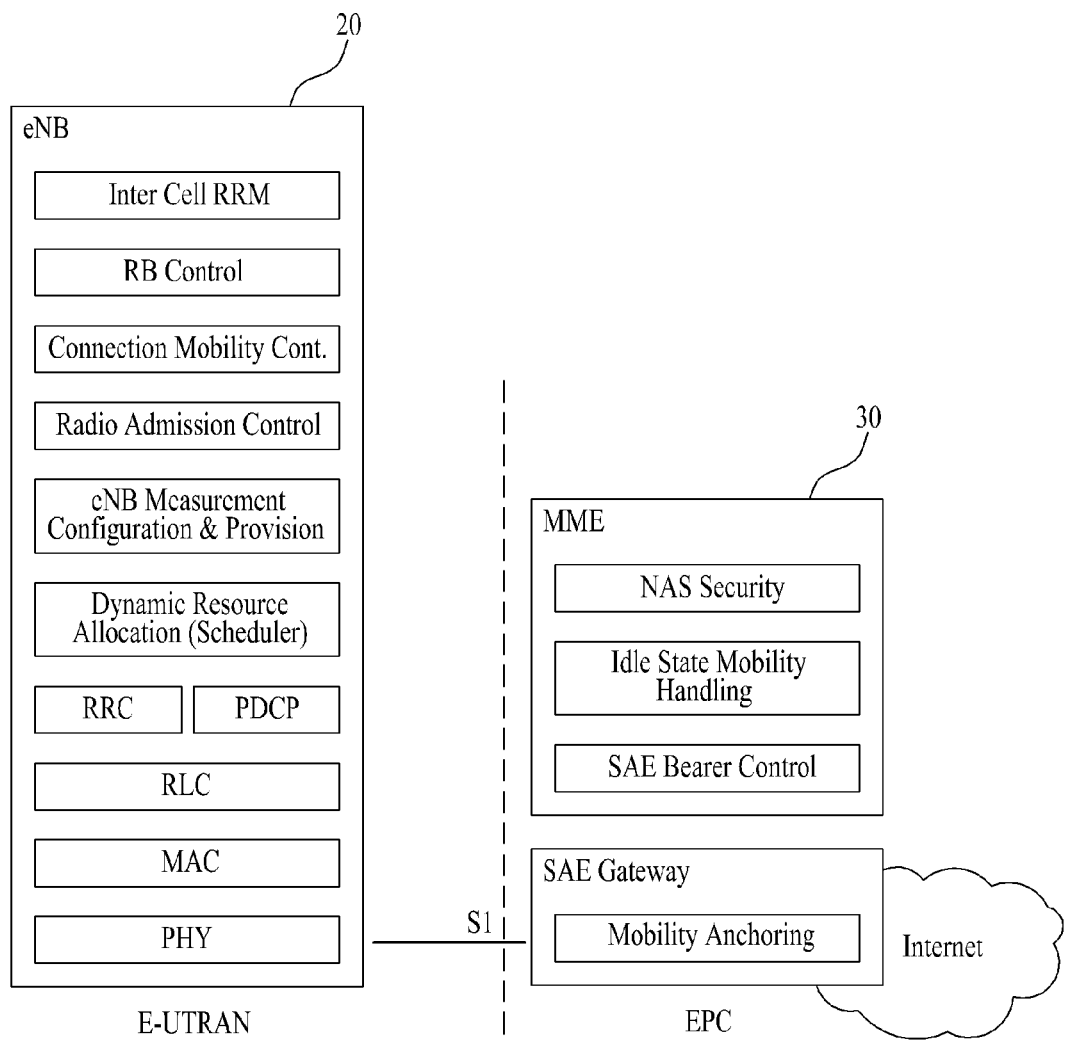
FIG. 2 illustrates an exemplary block diagram illustrating general structures of an E-UTRAN and an EPC.

FIG. 2 is an exemplary block diagram illustrating general structures of an E-UTRAN and an EPC. With reference to FIG. 2, eNB 20 may perform functions of selection for MME/SAE gateway 30, routing toward the gateway during a radio resource control (RRC) activation, scheduling and transmitting of paging messages, scheduling and transmitting of broadcast channel (BCCH) information, dynamic allocation of resources to UEs 10 in both uplink and downlink, configuration and provisioning of eNB measurements, radio bearer control, radio admission control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
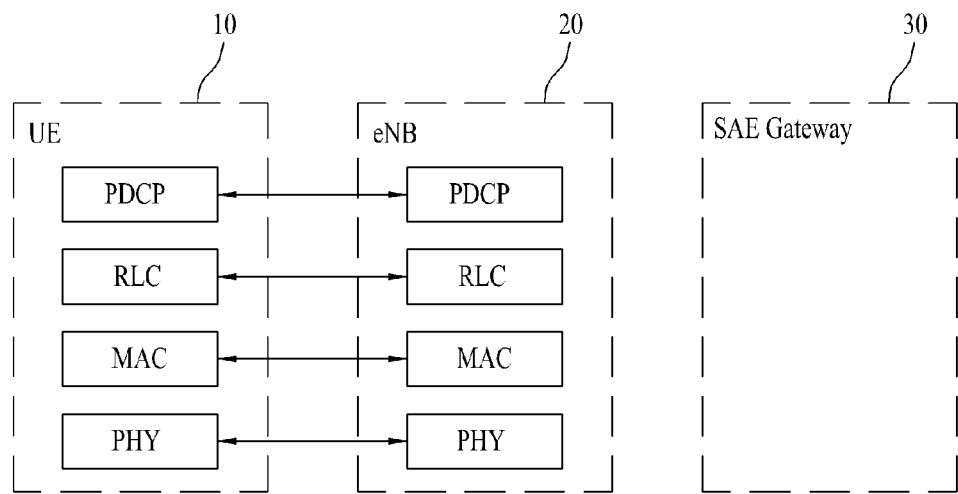
FIGS. 3a and 3b illustrate exemplary user-plane and control-plane protocol stacks for the E-UMTS network.
Figure 3B:
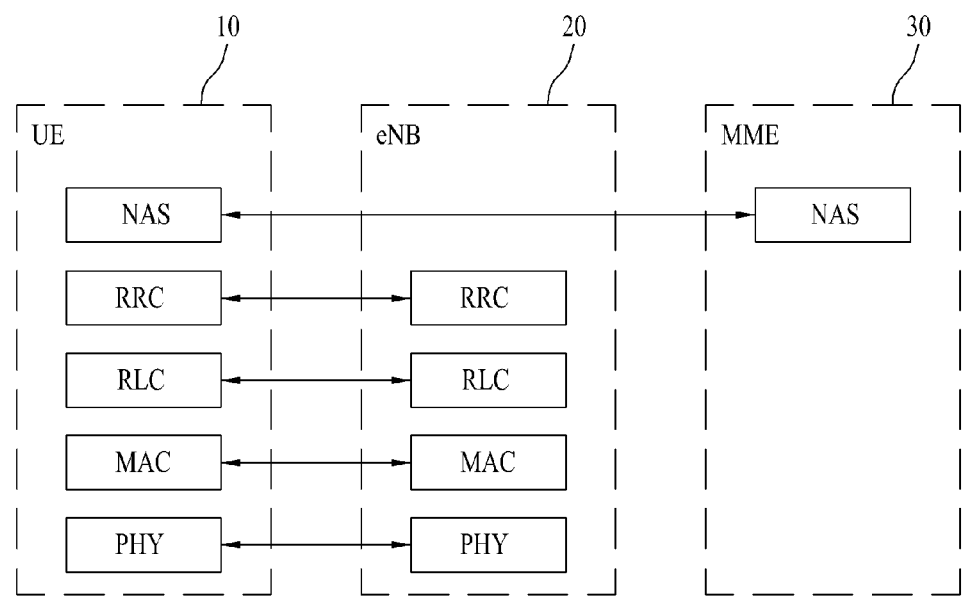

FIGS. 3a and 3b illustrate exemplary user-plane and control-plane protocol stacks for the E-UMTS network. With reference to FIGS. 3a and 3b, the protocol layers may be divided into a first layer (L1), a second layer (L2) and a third layer (L3) based upon the three lower layers of an Open System Interconnection (OSI) standard model.

The first layer L1 (or physical layer, PHY) provides an information transfer service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel using radio resources.

The second layer L2 comprises various layers. The MAC layer of Layer 2 (L2) serves to map between various logical channels and various transport channels. The MAC layer of Layer 2 (L2) also serves to multiplex logical channels by mapping various logical channels to one transport channel. The MAC layer of Layer 2 (L2) provides services to a radio link control (RLC) layer via a logical channel. A logical channel is classified into a control channel carrying control plane information and a traffic channel carrying user plane information based on information being carried.

The RLC layer of Layer 2 (L2) supports a reliable transmission of data. The RLC layer of Layer 2 (L2) serves to adjust the size of data received from the upper layer by segmentation and concatenation of data so as to be adequate for transmission by the lower layer. The RLC layer of Layer 2 (L2) provides three kinds of operation modes including a transparent mode (TM), an unacknowledged mode (UM), and an acknowledged mode (AM) in order to guarantee various QoS (Quality of Services) requirements of radio bearers (RBs). For example, AM RLC performs retransmission by automatic repeat and request (ARQ) function for reliable transmission of data. Although the RLC layer is shown as being separate from the MAC layer in FIGS. 3a and 3b, it is understood that the functions of the RLC layer may be performed by the MAC layer and thus a separate RLC layer may not be required.

With reference to FIG. 3a, the packet data convergence protocol (PDCP) layer of Layer 2 (L2) performs a header compression function that reduces unnecessary control information such that data being transmitted via internet protocol (IP) packets, such as IPv4 or IPv6, can be efficiently sent over a radio (wireless) interface with a relatively narrow bandwidth. This enables only necessary information to be carried via the header portion, serving to increase transmission efficiency of the radio interface. Moreover, in the LTE system, the PDCP layer of Layer 2 (L2) provides security functions, which comprises a ciphering function for preventing data interception and an integrity protection function for preventing data manipulation.

With reference to FIG. 3b, a radio resource control (RRC) layer located at the lowest portion of the third layer (L3) is typically defined in the control plane only and controls logical channels, transport channels and physical channels in relation to the configuration, reconfiguration, and release of the Radio Bearers (RBs). Here, a RB means a logical path provided by the first layer (L1) and the second layer (L2) for data transmission between the terminal and the E-UTRAN. A general meaning of configuring the RB is to specify the characteristics of radio protocol layers and channels for a specific service and to configure specific parameters and operations for them. A RB may be classified into a signaling RB (SRB) and a data RB (DRB). The SRB is used as a path for transferring an RRC message in the control plane, and the DRB is used as a path for transferring user data in the user plane.

With reference to FIG. 3a, the RLC and MAC layers (terminated in an eNB 20 on the network side) may perform functions such as scheduling, automatic repeat request (ARQ), and hybrid ARQ (HARM). The PDCP layer (terminated in eNB 20 on the network side) may perform functions such as header compression, integrity protection, and ciphering.

With reference to FIG. 3b, the RLC and MAC layers (terminated in an eNB 20 on the network side) perform the same or similar functions as those for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: a LTE_DETACHED state if there is no RRC entity; a LTE_IDLE state if there is no RRC connection while storing minimal UE information; and an LTE_ACTIVE state if the RRC connection is established.

Thus RRC state may be divided into two different states such as an RRC_IDLE state and an RRC_CONNECTED state.

In the RRC_IDLE state, the UE 10 may receive broadcasts of system information and paging information while the UE specifies a discontinuous reception (DRX) configured by NAS, and the UE has been allocated an identification (ID) (e.g., system architecture evolution—temporary mobile subscriber identity (S-TMSI)) which uniquely identifies the UE in a tracking area. In the RRC-IDLE state, no RRC context is stored in the eNB. In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB. In RRC_CONNECTED state, the E-UTRAN knows the cell to which the UE 10 belongs. Therefore, the network can transmit and/or receive data to/from UE 10, the network can control mobility (handover) of the UE.

Figure 4:
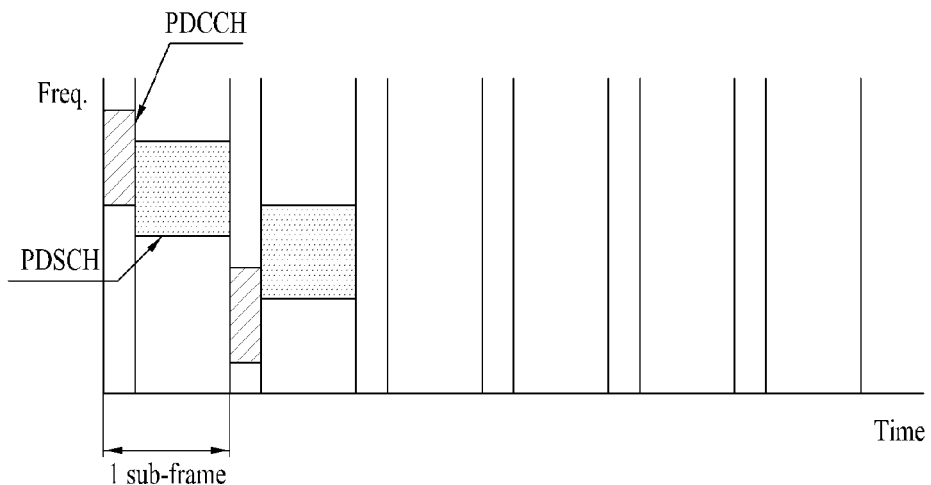
FIG. 4 illustrates an exemplary downlink subframe and physical channels.

FIG. 4 illustrates an exemplary downlink subframe and physical channels.

With reference to FIG. 4, the downlink subframe includes a plurality of slots (e.g., two). The number of OFDM symbols included in one slot may be changed according to the length of a cyclic prefix (CP). For example, in case of a normal CP, the slot may include seven OFDM symbols. The downlink subframe is divided into a data region and a control region in the time domain. A maximum of three (or four) OFDM symbols located in the front part of a first slot of the subframe may correspond to a control region to which a control channel is allocated. The remaining OFDM symbols correspond to a data region to which a physical downlink shared channel (PDSCH) is allocated. A variety of downlink control channels may be used in LTE(-A), for example, a physical control format indicator channel (PCFICH), a physical downlink control channel (PDCCH), a physical hybrid ARQ indicator channel (PHICH), etc. The PCFICH is transmitted on the first OFDM symbol of the subframe, and carries information about the number of OFDM symbols used for transmitting control channels within the subframe. The PHICH carries a hybrid automatic repeat request acknowledgment/negative-acknowledgment (HARQ ACK/NACK) signal as a response to an uplink transmission signal.

Control information transmitted via a PDCCH is referred to as downlink control information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a downLink shared channel (DL-SCH), transmission format and resource allocation information of an upLink shared channel (UL-SCH), paging information transmitted via a paging channel (PCH), system information transmitted via the DL-SCH, resource allocation information of an upper-layer control message such as a random access response transmitted via the PDSCH, a set of Tx power control commands of each UE contained in a UE group, a Tx power control command, activation indication information of voice over IP (VoIP), and the like. A plurality of PDCCHs may be transmitted within a control region. A UE can monitor a plurality of PDCCHs. A PDCCH is transmitted as an aggregate of one or more contiguous control channel elements (CCEs). The CCE is a logical allocation unit that is used to provide a predetermined coding rate based on a radio channel state for a PDCCH. The CCE may correspond to a plurality of resource element groups (REGs). The format of PDCCH and the number of PDCCH bits may be determined according to the number of CCEs. A base station (BS) decides a PDCCH format according to DCI to be sent to the UE, and adds a cyclic redundancy check (CRC) to control information. The CRC is masked with an identifier (e.g., radio network temporary identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., paging-RNTI (P-RNTI)). If a PDCCH is provided for system information (e.g., system information block (SIB)), a CRC may be masked with system information RNTI (SI-RNTI). If PDCCH is provided for a random access response, a CRC may be masked with random access-RNTI (RA-RNTI). For example, CRC masking (or scrambling) may be performed using an exclusive OR (XOR) operation between CRC and RNTI at a bit level.

Figure 5:
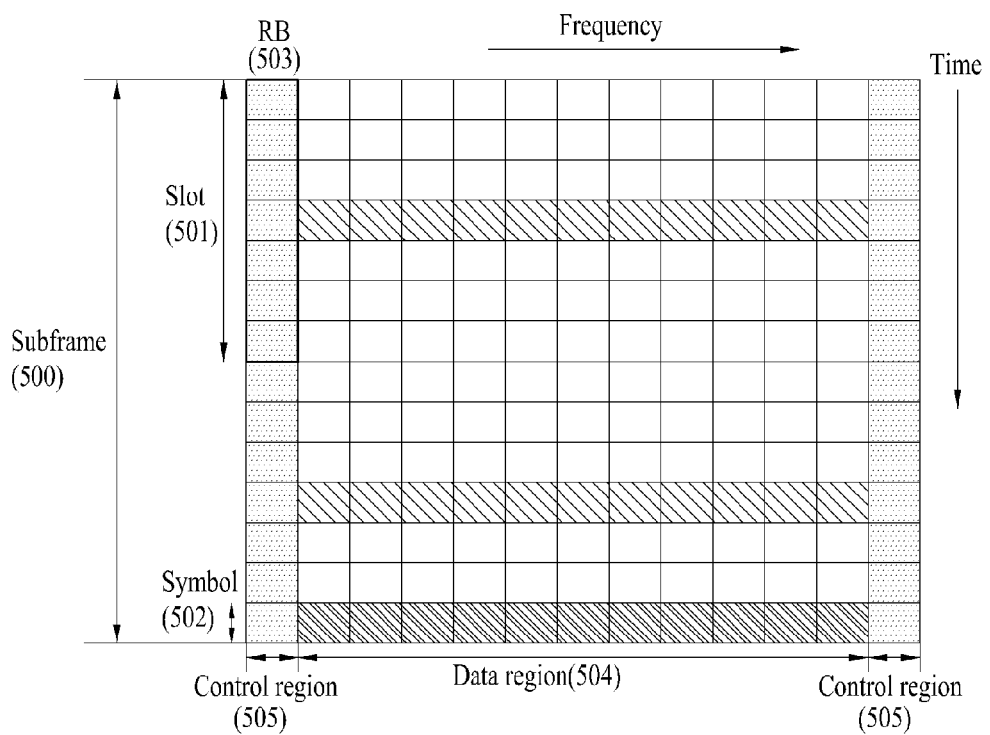
FIG. 5 is illustrates an exemplary structure of an uplink subframe.

FIG. 5 is illustrates an exemplary structure of an uplink subframe.

With reference to FIG. 5, 1 ms subframe 500, which is a basic unit of uplink transmission of LTE/LTE-A, includes two 0.5 ms slots 501. Assuming that a normal cyclic prefix (CP) is configured, a slot includes 7 symbols 502 and one symbol corresponds to one SC-FDMA symbol. A resource block 503 is a resource allocation unit which corresponds to 12 subcarriers in the frequency domain and corresponds to one slot in the time domain. A structure of an uplink subframe is mainly divided into a data region 504 and a control region 505. The data region is a series of communication resources that are used to transmit data such as audio or a packet to each UE and corresponds resources other than the control region in the subframe. The control region is a series of communication resources that are used to transmit a report for downlink channel quality, an ACK/NACK to a downlink signal, an uplink scheduling request, or the like from each UE. A sounding reference signal (SRS) is transmitted in the last SC-FDMA symbol of the subframe in the time domain and is transmitted through a data transmission band in the frequency domain.

Figure 6:
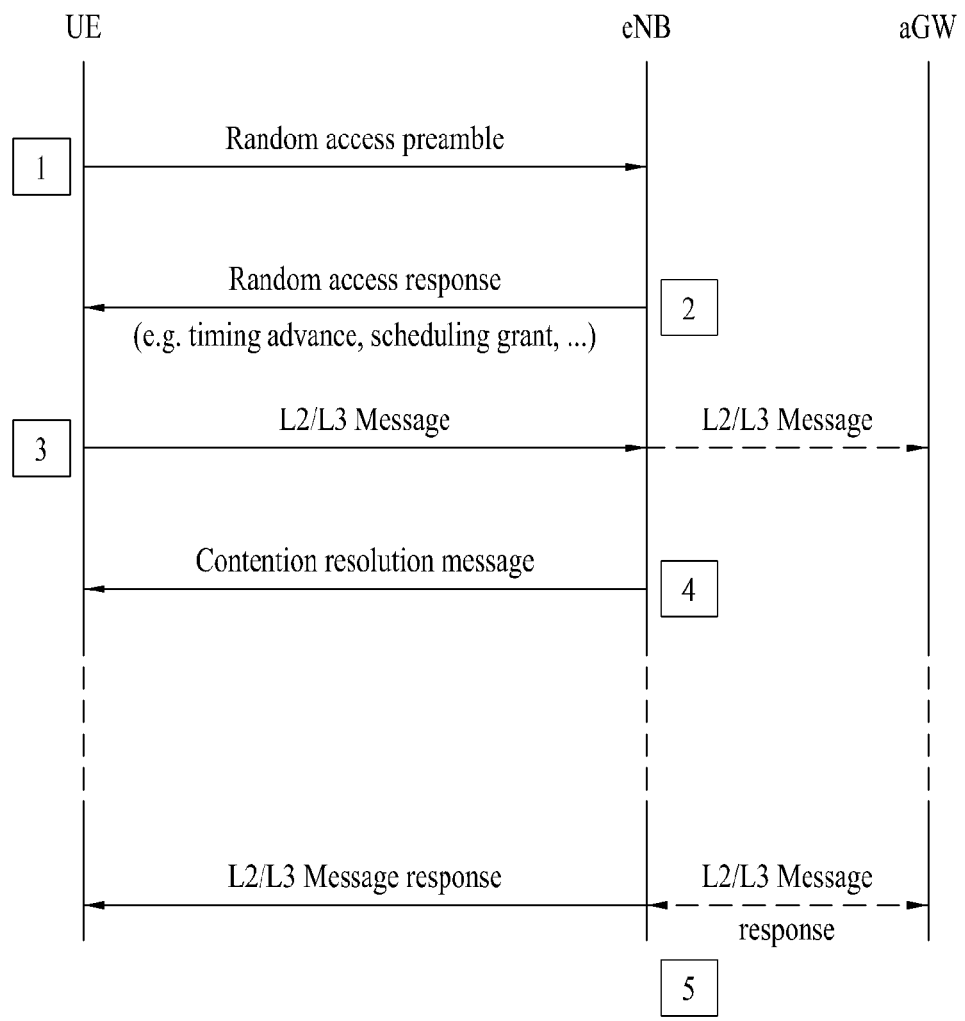
FIG. 6 illustrates a contention-based random access procedure.

FIG. 6 illustrates a contention-based random access procedure. The random access procedure is also referred to as a random access channel (RACH) procedure. The RACH procedure can be used for several purposes. For example the RACH procedure can be used to access the network, to request resources, to carry control information, to adjust the time offset of the uplink in order to obtain uplink synchronization, to adjust transmission power, etc.

With reference to FIG. 6, firstly the UE retrieves information transmitted periodically from eNB on a downlink broadcast channel (BCH) and selects a preamble signature (e.g., constant amplitude zero auto-correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response, adapts UL transmission timing and adapts UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to restart the RACH procedure. If the UE was not in collision, the eNB sends a resource assignment message (message 5, box 5). Subsequent transmissions are carried out as usual.

Figure 7:
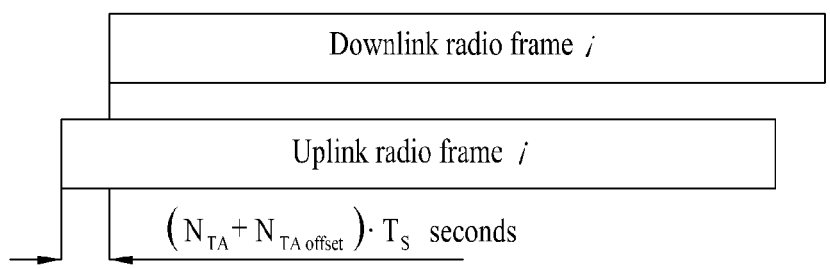
FIG. 7 illustrates an example of uplink-downlink timing relation.

FIG. 7 illustrates an example of uplink-downlink timing relation.

In the LTE system based on an orthogonal frequency division multiplex (OFDM) technology, the length of time a signal takes to reach a base station from a UE may vary according to a radius of a cell, a location of the UE in a cell, a mobility of the UE, etc. That is, unless the base station controls UL transmission timing for each UE, there is possibility of interferences between UEs during a communication between the UE and the base station, and this causes an increase of error rate in the base station. The length of time a signal takes to reach a base station from a UE may be referred to as a timing advance. More particularly, a UE may be located randomly within a cell, and this implies that the timing advance from the UE to the eNB can be varied based on a location of the UE. Namely, if a UE is located on edge of a cell, the timing advance of the UE will be much longer than the timing advance of UEs which are located on a center of the cell. In contrast, if a UE is located on the center of the cell, the timing advance of the UE will be much shorter than a timing advance of UEs which are located on the edge of the cell. A base station must manage or handle all data or signals transmitted by UEs within the cell in order to prevent interferences between UEs. Namely, a base station must adjust or manage a transmission timing of UEs according to each UE's circumstances, and such adjustment or management may be referred to as a maintenance of timing advance (or time alignment). The maintenance of timing advance (or time alignment) may be performed via a random access procedure. Namely, during the random access procedure, a base station receives a random access preamble transmitted from a UE, and the base station can calculate a timing advance (Sync) value using the received random access preamble, where the timing advance value is to adjust (i.e., faster or slower) a signal transmission timing of the UE. The calculated timing advance value can be notified to the UE by a random access response, and the UE can update the signal transmission timing based on the calculated timing advance value. As an alternative, a base station may receive a sounding reference signal (SRS) transmitted from a UE periodically or randomly, the base station may calculate the timing advance (Sync) value based on the SRS, and the UE may update the signal transmission timing based on the calculated timing advance value.

As explained above, a base station may measure a timing advance of a UE via a random access preamble or SRS, and may notify an adjustment value of time alignment to the UE. Here, the value for time alignment (i.e., the adjustment value of time alignment) can be referred to as a timing advance command (TAC). The TAC may be processed by a MAC (medium access control) layer. Since a UE does not remain in a fixed location, the transmission timing is frequently changed according to the UE's location and/or mobility. Thus, if the UE receives the timing advance command (TAC) from eNB, the UE expect that the timing advance command is valid only for certain time duration. A time alignment timer (TAT) is used for indicating or representing the certain time duration. As such, the time alignment timer (TAT) is started when a UE receives a TAC (time advance command) from a base station. The TAT value is transmitted to the UE through a RRC (Radio Resource Control) signal such as system information (SI) or a radio bearer reconfiguration. Also, if a UE receives a new TAC from a base station during an operation of the TAT, the TAT is restarted. Further, the UE does not transmit any other uplink data or control signal, e.g., data on physical uplink shared channel (PUSCH), control signal on Physical uplink control channel (PUCCH), except for a random access preamble when the TAT expires or is not running.

With reference to FIG. 7, transmission of the uplink radio frame number i from a UE may start $(N_{TA}+N_{TAoffset})\times T_s$ seconds before the start of the corresponding downlink radio frame at the UE, where $0 \le N_{TA} \le 20512$, $N_{TAoffset}=0$ for FDD frame structure and $N_{TAoffset}=624$ for TDD frame structure. When $N_{TA}$ is indicated by a timing advance command, the UE may adjust a transmission timing of UL signals (e.g., PUCCH, PUSCH, SRS, etc.) by using $(N_{TA}+N_{TAoffset})\times T_s$. UL transmission timing may be adjusted in units of a multiple of $16T_s$. $T_s$ represents a sampling time. A timing advance command (TAC) in a random access response is 11 bits and indicates a value of 0, 1, 2, . . . , 1282, and $N_{TA}$ is given as $N_{TA}=TA*16$. Otherwise, a timing advance command (TAC) is 6 bits and indicates a value of 0, 1, 2, . . . , 63, and $N_{TA}$ is given as $N_{TA,old}+(TA-31)*16$. The timing advance command received in subframe n is applied starting from subframe n+6.

Figure 8:
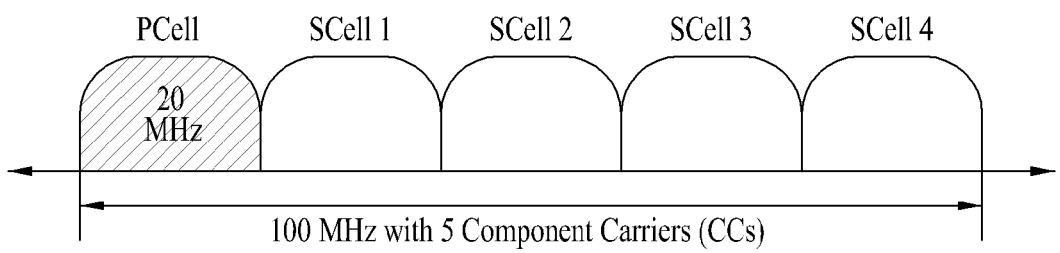
FIG. 8 illustrates an example of Carrier Aggregation (CA).

FIG. 8 illustrates an example of Carrier Aggregation (CA).

With reference to FIG. 8, two or more carriers can be aggregated in order to support wider transmission bandwidths. Each of the aggregated carriers is referred to as a Component Carrier (CC). From the perspective of CC, LTE system may be understood as a system of one CC. An LTE-A UE may simultaneously receive or transmit on one or multiple CCs depending on its capabilities. For example, LTE-A UE with capabilities for CA can simultaneously receive and/or transmit on multiple CCs corresponding to multiple cells. Meanwhile, an LTE UE can receive on a single CC and transmit on a single CC corresponding to one cell only. Here, a cell is a combination of downlink and optionally uplink resources. CA supports both contiguous and noncontiguous CCs, in which each CC may be limited to a maximum of 20 MHz. When CA is configured, the UE has one RRC connection with the network. At RRC connection establishment/re-establishment/handover, one cell provides the NAS mobility information (e.g. tracking area identity, TAI), and at RRC connection re-establishment/handover, one cell provides the security input. This cell may be referred to as a primary cell (PCell). In the downlink, the carrier corresponding to the PCell is the downlink primary component carrier (DL PCC) while in the uplink it is the uplink primary component carrier (UL PCC). Cell(s) other than PCell may be referred to as a secondary cell (SCell). Depending on UE's capabilities, SCells can be configured to form together with the PCell a set of serving cells. In the downlink, the carrier corresponding to a SCell is a downlink secondary component carrier (DL SCC) while in the uplink it is an uplink secondary component carrier (UL SCC).

Figure 9:
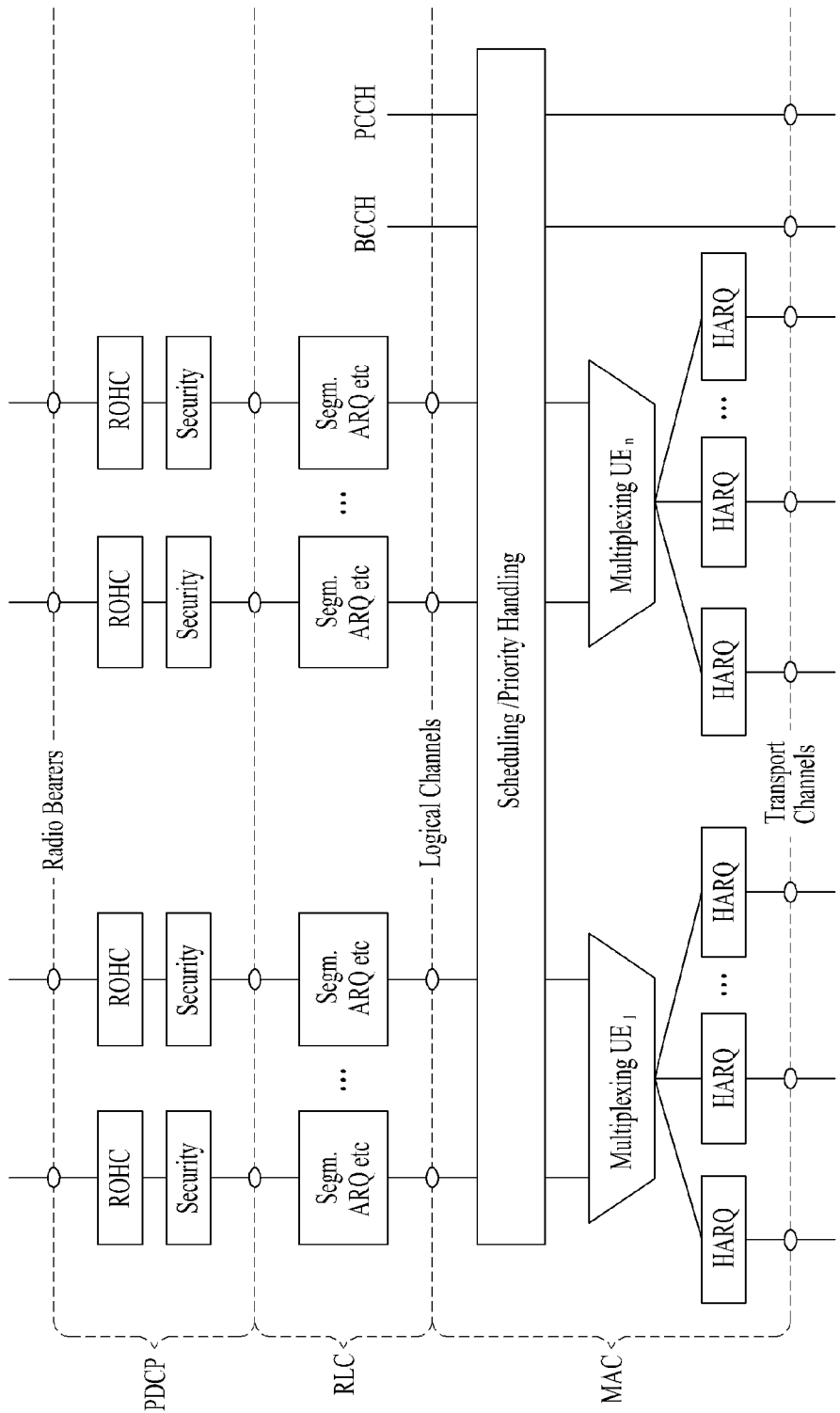
FIG. 9 illustrates an exemplary downlink structure of protocol layer 2 in consideration of CA.
Figure 10:
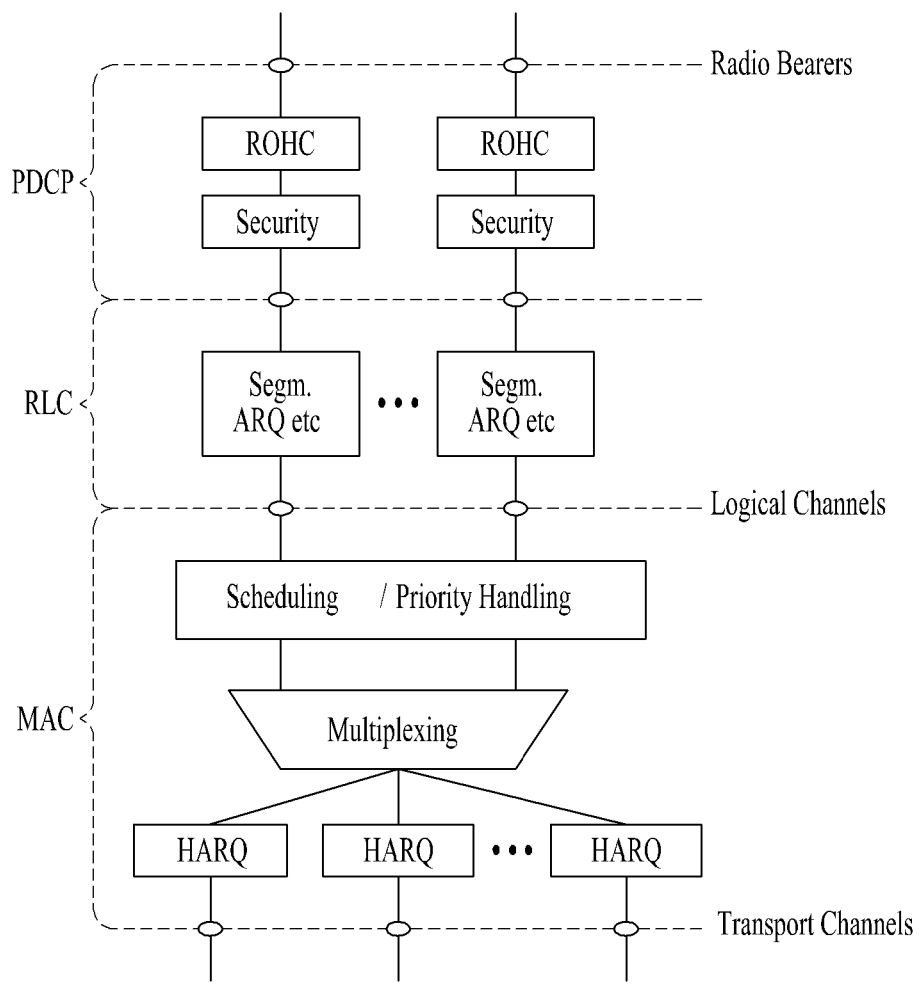
FIG. 10 illustrates an exemplary uplink structure of protocol layer 2 in consideration of CA.

FIG. 9 illustrates an exemplary downlink structure of protocol layer 2 in consideration of CA. FIG. 10 illustrates an exemplary uplink structure of protocol layer 2 in consideration of CA. A CA scheme has much influence on the MAC layer of layer 2. For example, when CA is configured, a plurality of CCs are used and one HARQ entity manages one CC, thus the MAC layer should be able to perform operations related with a plurality of HARQ entities. In addition, each HARQ entity independently processes a transport block (TB), thus a plurality of transport blocks may be transmitted and/or received at the same time when CA is configured.

In CA, a network (particularly, eNB) may add and release SCell(s) for a UE depending on the UE's traffic situation. To modify an RRC connection, e.g. to add/modify/release SCell(s) for a UE, the network may initiate RRC connection reconfiguration procedure to the UE in RRC_CONNECTED. When the network initiates the RRC connection reconfiguration procedure, the addition of SCell(s) is performed only when access stratum (AS) security has been activated. When the UE receives an RRCConnectionReconfiguration message from the network, if the received RRCConnectionReconfiguration message includes the sCellToReleaseList, the UE may perform SCell release. And if the received RRCConnectionReconfiguration message includes the sCellToAddModList, the UE may perform SCell addition or modification. In addition, in order to reduce overhead due to the addition and release of SCell(s), instead of newly configuring (e.g., adding and releasing) SCell(s) when it is needed, the network may activate and deactivate configured SCell(s), while PCell is always activated. Activation/deactivation of a SCell is explained below in detail.

If a SCell is deactivated:
the UE does not transmit SRS on the SCell;
the UE does not report channel quality indicator (CQI)/precoding matrix index (PMI)/rank indicator (RI)/precoding type indicator (PTI) for the SCell;
the UE does not transmit on UL-SCH on the SCell;
the UE does not monitor the PDCCH on the SCell;
the UE does not monitor the PDCCH for the SCell.

The network activates/deactivates the SCell(s) by sending an Activation/Deactivation MAC Control Element (MAC CE).

Figure 11:
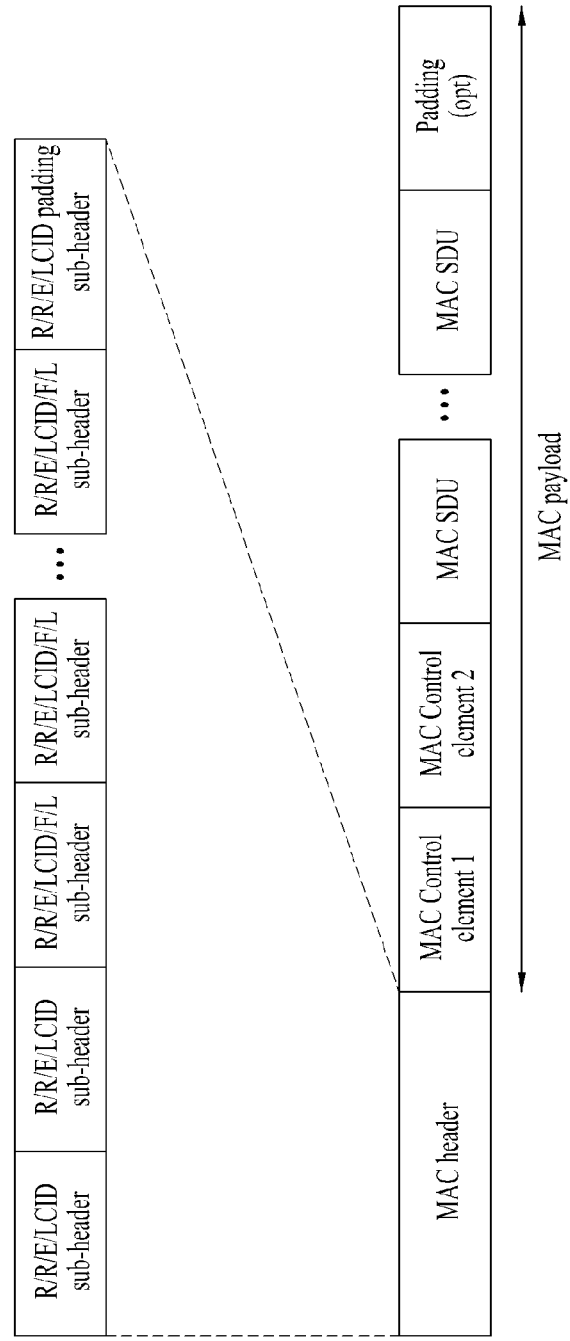
FIG. 11 illustrates an exemplary MAC PDU structure.

FIG. 11 illustrates an exemplary MAC PDU structure. A MAC PDU is transmitted via a downlink shared channel (DL-SCH) and an uplink shared channel (UL-SCH). A MAC PDU consists of a MAC header, zero or more MAC service data units (MAC SDUs), zero or more MAC control elements (MAC CEs), and optionally padding. MAC PDU subheaders have the same order as the corresponding MAC SDUs, MAC control elements and padding. MAC control elements are always placed before any MAC SDU.

Figure 12:
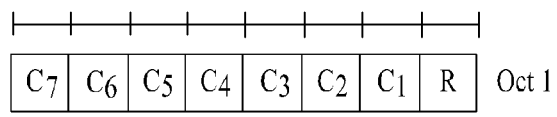
FIG. 12 illustrates an activation/deactivation MAC CE.

FIG. 12 illustrates an activation/deactivation MAC CE. The activation/deactivation MAC CE is identified by a MAC PDU subheader with logical channel identifier (LCID) (e.g., LCID=11011) indicating activation/deactivation. The activation/deactivation MAC CE consists of a single octet containing seven C-fields and one R-field.

$C_i$: if there is an SCell configured with SCellIndex i, this field indicates the activation/deactivation status of the SCell with SCellIndex i, else the UE may ignore the $C_i$ field. The $C_i$ field is set to "1" to indicate that the SCell with SCellIndex i will be activated. The $C_i$ field is set to "0" to indicate that the SCell with SCellIndex i will be deactivated; and R: Reserved bit, set to "0".

Meanwhile, when the network transmits an activation/deactivation command in order to deactivate SCell(s), the UE may miss the activation/deactivation command due to any reason such as radio conditions. In order to address this problem, the UE assumes that a SCell is in a deactivation state when the SCell has not been used for a certain time, instead of not maintaining activation state of a SCell. As an example, the UE may operate a secondary serving cell deactivation timer (e.g., sCellDeactivationTimer) per each configured SCell and deactivate an associated SCell upon its expiry. The timer value is configured per UE, i.e., the same timer value applies for each SCell. The timer value may be indicated as the number of radio frames, e.g., {2 ms, 4 ms, 8 ms, 16 ms, 32 ms, 64 ms, 128 ms}. The timer value may be signaled by using a RRC message, in particular MAC configuration information for signaling and data radio bearers in the RRC message.

Configured SCell(s) is initially deactivated upon addition and after a handover.

The UE may for each transmission time interval (TTI) and for each configured SCell:
if the UE receives an Activation/Deactivation MAC CE in this TTI activating the SCell, the UE may in the TTI:
activate the SCell; i.e. apply normal SCell operation including:
SRS transmissions on the SCell;
CQI/PMI/RI/PTI reporting for the SCell;
PDCCH monitoring on the SCell;
PDCCH monitoring for the SCell
start or restart the sCellDeactivationTimer associated with the SCell;
else, if the UE receives an Activation/Deactivation MAC CE in this TTI deactivating the SCell; or
if the sCellDeactivationTimer associated with the activated SCell expires in this TTI:
deactivate the SCell;
stop the sCellDeactivationTimer associated with the SCell;
flush all HARQ buffers associated with the SCell.
if PDCCH on the activated SCell indicates an uplink grant or downlink assignment; or
if PDCCH on the Serving Cell scheduling the activated SCell indicates an uplink grant or a downlink assignment for the activated SCell:
restart the sCellDeactivationTimer associated with the SCell;
if the SCell is deactivated:
not transmit SRS on the SCell;
not report CQI/PMI/RI/PTI for the SCell;
not transmit on UL-SCH on the SCell;
not monitor the PDCCH on the SCell;
not monitor the PDCCH for the SCell.

Figure 13:
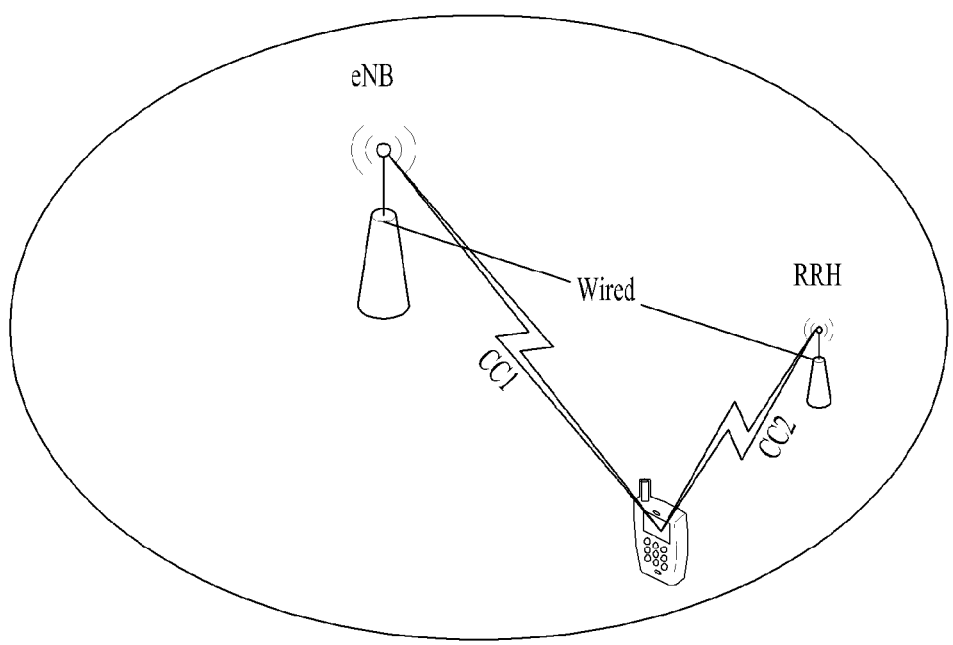
FIG. 13 illustrates an example that a plurality of CCs with different frequency characteristics are aggregated.

FIG. 13 illustrates an example that a plurality of CCs with different frequency characteristics are aggregated.

With reference to FIG. 13, 2 CCs are aggregated and configured for a UE, one (CC1) of which communicates signals using an Remote Radio Header (RRH) (e.g., repeater) due to limited coverage, and the other one (CC2) of which directly communicates with a base station without the RRH. Thus, a propagation delay (or a reception timing at the base station) of UL signals, which are transmitted via CC1 from the UE, may be different from a propagation delay (or a reception timing at the base station) of UL signals, which are transmitted via CC2 from the UE. In this case, if uplink signals are transmitted on a plurality of serving cells without synchronizing transmission timing, interferences between cells may occur. Thus a plurality of time alignment maintenances (or timing advance maintenances) may be needed.

Meanwhile, when the UE uses a plurality of serving cells, there may be serving cells showing similar timing advance characteristics. For example, serving cells in the same band may show similar timing advance characteristics. Thus, in CA, in order to optimize a signal overhead due to adjusting a plurality of uplink timing synchronizations, serving cells showing similar timing advance characteristics may be managed as a group, which is called as a timing advance group (TAG). To this end, serving cell(s) showing similar timing advance characteristics may belong to a TAG, and at least one of the serving cell(s) in the TAG should have an uplink resource. For each serving cell, a base station may inform a UE of TAG assignment by using a TAG identifier in an RRC signal. The TAG identifier may be a value from 1 to a maximum number of TAGs that can be configured for a UE. Two or more TAGs may be configured for a UE. If a TAG identifier indicates 0, it may mean a TAG including a PCell. For convenience, a TAG including the PCell is referred to a primary TAG (pTAG), and another TAG(s) other than pTAG is referred to a secondary TAG (sTAG or secTAG). A secondary TAG identifier (sTAG-ID or secTAG-ID) may be used to indicate a corresponding sTAG of an SCell. If secTAG-ID is not configured for an SCell, the SCell may be configured as a part of the pTAG.

Figure 14:
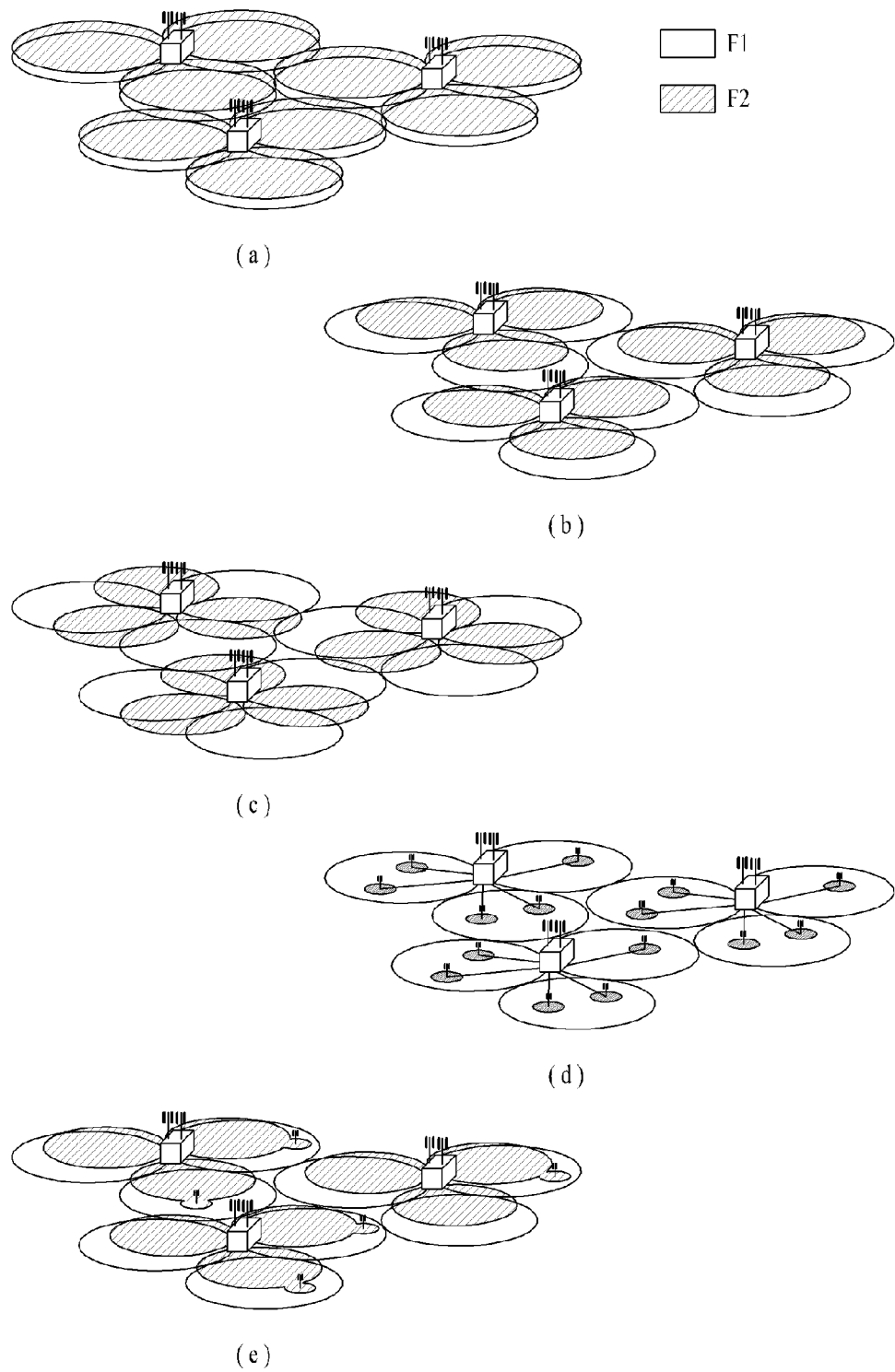
FIG. 14 illustrates another examples that 2 CCs with different frequency characteristics are aggregated.

FIG. 14 illustrates another examples that 2 CCs with different frequency characteristics are aggregated.

With reference to FIG. 14(a), F1 and F2 cells are co-located and overlaid, providing nearly the same coverage. Both layers provide sufficient coverage and mobility can be supported on both layers. Likely scenario is when F1 and F2 are of the same band, e.g., 2 GHz, 800 MHz, etc. It is expected that aggregation is possible between overlaid F1 and F2 cells.

With reference to FIG. 14(b), F1 and F2 cells are co-located and overlaid, but F2 has smaller coverage due to larger path loss. Only F1 provides sufficient coverage and F2 is used to improve throughput. Mobility is performed based on F1 coverage. Likely scenario when F1 and F2 are of different bands, e.g., F1={800 MHz, 2 GHz} and F2={3.5 GHz}, etc. It is expected that aggregation is possible between overlaid F1 and F2 cells.

With reference to FIG. 14(c), F1 and F2 cells are co-located but F2 antennas are directed to the cell boundaries of F1 so that cell edge throughput is increased. F1 provides sufficient coverage but F2 potentially has holes, e.g., due to larger path loss. Mobility is based on F1 coverage. Likely scenario is when F1 and F2 are of different bands, e.g., F1={800 MHz, 2 GHz} and F2={3.5 GHz}, etc. It is expected that F1 and F2 cells of the same eNB can be aggregated where coverage overlaps.

With reference to FIG. 14(d), F1 provides macro coverage and on F2 Remote Radio Heads (RRHs) are used to improve throughput at hot spots. Mobility is performed based on F1 coverage. Likely scenario is when F1 and F2 are of different bands, e.g., F1={800 MHz, 2 GHz} and F2={3.5 GHz}, etc. It is expected that F2 RRHs cells can be aggregated with the underlying F1 macro cells.

With reference to FIG. 14(e), similar to the example of FIG. 14(b), but frequency selective repeaters are deployed so that coverage is extended for one of the carrier frequencies. It is expected that F1 and F2 cells of the same eNB can be aggregated where coverage overlaps.

In case of examples of FIG. 14(b) to FIG. 14(e), serving cells F1 and F2 may have different frequency characteristics. Thus, maintenance of multiple timing advances and multiple timing advance groups may be needed for the examples of FIG. 14(b) to FIG. 14(e).

Figure 15:
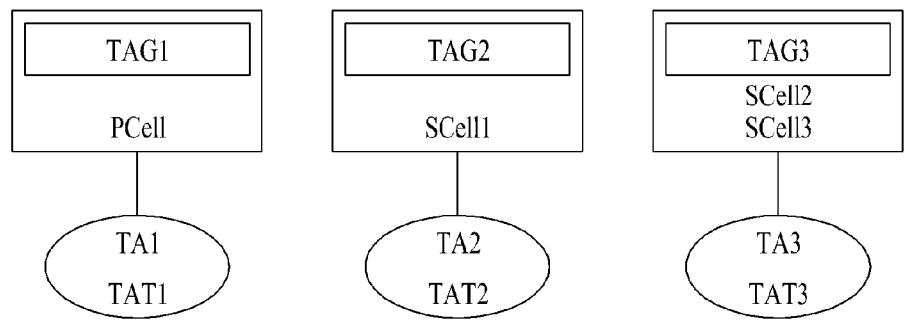
FIG. 15 illustrates an example of configuring timing advance groups for serving cells having similar timing advance characteristics.

FIG. 15 illustrates an example of configuring timing advance groups for serving cells having similar timing advance characteristics.

As described above, when a UE receives a timing advance command (TAC) from a base station, the UE may start a time alignment timer (TAT). And the UE and the base station assume that a transmission timing is aligned (or synchronized) only when the TAT is running. When carrier aggregation (CA) is configured for the UE, the UE manages time alignment per timing advance group (TAG), and a TAT is running per TAG. Thus, the same amount of time alignment (or timing advance) may be applied for each serving cell in the same TAG. And, when a TAT associated with a TAG to which a serving cell belongs to expires or is not running, the UE may not perform any uplink transmission on the serving cell except a random access preamble transmission.

When adjusting uplink time alignment (or synchronization) for a UE with a plurality of serving cells configured for CA, at least one of the following principles may be applied:

Each TAG may be configured to have different TAT values;

A TAG containing a primary serving cell (PCell) is referred to as a primary TAG (pTAG), and a TAG containing only at least one secondary serving cell (SCell) is referred to as a secondary TAG (sTAG or secTAG);

When the UE firstly adjust a time alignment on a SCell which belongs to a sTAG, the UE may start a random access procedure on the SCell only if receiving a command from the base station. The UE may not start a random access procedure on the SCell without the command from the base station even if it is necessary;

When a TAT associated with the sTAG expired or is not running, it is assumed that transmission timing on serving cells which belong to a sTAG are not aligned (or synchronized);

When a TAT associated with a pTAG expired or is not running, other TATs associated with other TAGs may not run. In this case, it is assumed that transmission timing on all the serving cells are not aligned (or synchronized);

The UE may select any serving cell among activated serving cells of sTAG and use the selected serving cell as a timing reference cell;

The timing reference cell may be used to adjust time alignment through a random access procedure.

With reference to FIG. 15, three exemplary TAGs, e.g., TAG1, TAG2, and TAG3, are configured for a UE. In FIG. 15, TAG1 may be referred to as a primary TAG (pTAG) since TAG1 contains a PCell. Each of TAG2 and TAG3 may be referred to as a secondary TAG (sTAG) since they contain SCell(s) only. TAG1, TAG2, and TAG3 may have different timing advance (or time alignment) values, e.g., TA1, TA2, and TA3, respectively. Moreover, TAG1, TAG2, and TAG3 may be configured to have different time alignment timers, e.g., TAT1, TAT2, and TAT3. The UE is allowed to start a random access procedure on serving cells which belong to sTAGs, e.g., TAG2 and TAG3, only when the UE receives a command from a base station. When TAT1 associated with pTAG has expired or is not running, the other TATs, e.g. TAT2 and TAT3, are not allowed to run. Thus, when TAT1 has expired or is not running, it is assumed that time alignments on PCell, SCell1, SCell2, and SCell3 are not correct. Meanwhile, when a TAT associated with a sTAG has expired or is not running, it is assumed that the time alignment(s) on the corresponding SCell(s) associated with sTAG are not correct. For example, when TAT2 associated with TAG2 has expired or is not running, it is assumed that only the time alignment on the SCell1 associated with TAG2 is not correct. When TAT3 associated with TAG3 has expired or is not running, it is assumed that only the time alignments on SCells 2 and 3 associated with TAG3 are not correct.

EXAMPLE

Cell Deactivation Control in CA

When adding a new secondary serving cell for a UE, an eNB may assign the newly added secondary serving cell to a new or existing TAG in consideration of an amount of time alignment on the corresponding secondary serving cell. However, the eNB may not exactly predict the amount of time alignment on the secondary serving cell before a random access procedure or uplink transmission occurs, and thus the eNB may not assign the secondary serving cell to a proper TAG. Moreover, the predicted amount of time alignment may vary according to a location and/or mobility of the UE.

The eNB may measure the amount of time alignment via a random access procedure or uplink transmission performed by the UE. As a result of measuring the amount of time alignment, the eNB may determine that the secondary serving cell has been assigned to an improper TAG, and the eNB may re-assign the secondary serving cell to a new TAG. In this case, the eNB may have to prohibit uplink transmissions on the secondary serving cell because an improper time alignment causes intra-cell or inter-cell interferences.

In the conventional techniques, to prohibit uplink transmissions in case of re-assigning the TAG, the eNB may release the secondary serving cell which has been assigned to an improper TAG and re-add the secondary serving cell for the UE. Then, the eNB may assign the secondary serving cell to the proper TAG and activate the secondary serving cell. To this end, the eNB may send an RRC signalling (e.g., RRC-ConnectionReconfiguration message) or a MAC signalling. As an alternative, to prohibit uplink transmissions in case of re-assigning the TAG, the eNB may send to the UE an Activation/Deactivation MAC control element deactivating the secondary serving cell which has been assigned to an improper TAG, and after the secondary serving cell is deactivated, the eNB may additionally transmit a message for changing TAG for the secondary serving cell. However, such procedures cause a signaling burden between the eNB and the UE.

In order to address the above problems, the present invention proposes implicitly (or automatically) deactivating a serving cell when receiving a signal indicating a TAG re-assignment of the serving cell. The signal indicating the TAG re-assignment may be transmitted from the eNB to the UE by using an RRC signal or a MAC signal. The signal indicating the TAG re-assignment may include information identifying a corresponding TAG. For example, the signal indicating the TAG re-assignment may include serving cell identification information and TAG identification information. For example, the signal may have a format of <serving cell identifier, TAG identifier>. In an example, the serving cell identifier may be a secondary serving cell identifier (e.g., SCellIndex). In the present specification, TAG change or TAG re-association may have a meaning equivalent to TAG re-assignment.

The serving cell identification information may indicate one of serving cells configured for the UE. Then, the UE may assign the serving cell indicated by the serving cell identification information to a TAG indicated by TAG identification information. For example, when the secondary serving cell identifier (e.g., SCellIndex) indicates a secondary serving cell which has been already configured for the UE and the TAG identifier indicates a TAG which is different from the TAG to which the secondary serving cell belongs, the UE may re-assign the secondary serving cell indicated by the secondary serving cell identifier to the TAG indicated by the TAG identifier. In this case, the UE may implicitly (or automatically) deactivate the secondary serving cell to prohibit any uplink transmissions on the secondary serving cell, thereby preventing any interfereces between cells. When the serving cell is deactivated:

the UE may not transmit SRS on the secondary serving cell;
the UE may not report CQI/PMI/RI/PTI for the SCell;
the UE may not transmit on UL-SCH on the SCell;
the UE may not monitor the PDCCH on the SCell;
the UE may not monitor the PDCCH for the SCell.

An exemplary method in accordance with the present invention may be performed as follows.

When an eNB re-associates a serving cell with a new or an existing TAG, the eNB may send an RRC signalling or a MAC signalling to the UE, including a SCell identifier and a TAG identifier (TAG ID). If needed, a PDCCH order may be transmitted along with the SCell identifier and the TAG ID.

When the UE receives the RRC signalling or the MAC signalling from the eNB, if the SCell identifier is already part of current UE configuration and if the TAG ID is different from the previous one, If the SCell is activated in the previous TAG, the UE may implicitly deactivate the SCell.
Else if the SCell is deactivated in the previous TAG, the UE may implicitly activate the SCell, and the UE may initiate a random access procedure. Or, the UE may implicitly activate the SCell, and if the UE receives a PDCCH along with the SCell identifier (and/or) the TAG ID, the UE may initiate a random access procedure.

The UE may re-associate the SCell with a new or an existing TAG.

In addition, a special TAG may be pre-defined for the purpose of changing a TAG of a serving cell. When an eNB determines that the serving cell has been assigned to an improper TAG and tries to re-assign the serving cell to a proper TAG, the eNB may temporally change the TAG of the serving cell into the pre-defined TAG. And then, the eNB may find a proper TAG for the serving cell via a random access procedure or uplink transmissions performed by the UE and re-assign the serving cell to the proper TAG. Thus, when the serving cell is assigned to the pre-defined TAG, uplink transmissions on the serving cell need to be prohibited because time alignments on the serving cell may not be correct. Therefore, the implicit (or automatic) deactivation of the serving cell may be performed when the TAG assigned for the serving cell is changed into the pre-defined TAG. The pre-defined TAG may be referred to as a special TAG or a temporary TAG.

Figure 16:
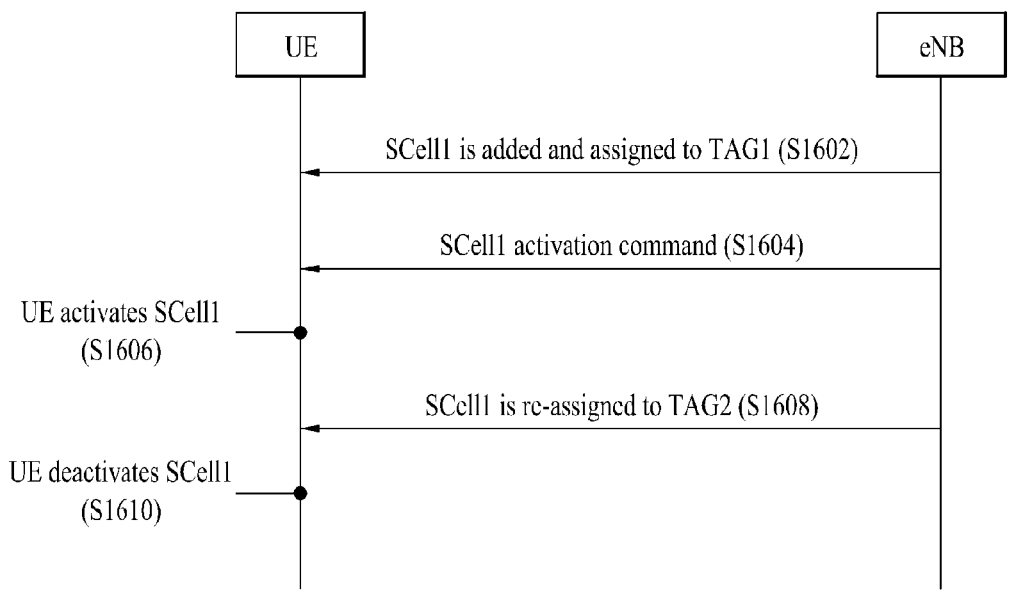
FIG. 16 illustrates an exemplary method of controlling deactivation of a serving cell in accordance with the present invention.

FIG. 16 illustrates an exemplary method of controlling deactivation of a serving cell in accordance with the present invention.

With reference to FIG. 16, an eNB may add a secondary serving cell (e.g. SCell1) for a UE, and assign the secondary serving cell (e.g. SCell1) to a new or existing timing advance group (e.g. TAG1) (S1602). The timing advance group TAG1 may be a primary TAG (pTAG) or a secondary TAG (sTAG).

Then, the eNB may send an activation command for the secondary serving cell SCell1 (S1604). For example, the activation command may be sent via a MAC signalling. For example, the eNB may send an Activation/Deactivation MAC control element with the corresponding bit set to activate the secondary serving cell SCell1.

When the UE receives the activation command for the secondary serving cell (e.g. SCell1) from the eNB, the UE may activate the secondary serving cell (e.g. SCell1) (S1606). At the same time, the UE may start a secondary serving cell deactivation timer (e.g., sCellDeactivationTimer) for the secondary serving cell (e.g. SCell1).

Then, the eNB may determine via a random access procedure or uplink transmission on the activated secondary serving cell whether the secondary serving cell (e.g. SCell1) has been assigned to a proper TAG. If the eNB determines that the TAG1 is not proper for the secondary serving cell, the eNB may re-assign the secondary serving cell from TAG1 to TAG2 (S1608). In this case, the eNB may send a signal indicating a TAG re-assignment of the secondary serving cell (e.g. SCell1) to the UE. For example, the signal indicating the TAG re-assignment of the secondary serving cell (e.g. SCell1) may include timing advance group assignment information in the format of <a serving cell identifier, TAG identifier>. In FIG. 16, the signal indicating the TAG re-assignment of the SCell1 may include <the serving cell identifier of SCell1, the TAG identifier of TAG2>. The serving cell identifier of SCell1 may include for example a sCellIndex of the SCell1. When changing a TAG, the TAG identifier of TAG2 may be different from the TAG identifier of TAG1. If needed, the eNB may transmit a PDCCH order along with the timing advance group assignment information.

When the UE receives the signal indicating the TAG re-assignment of the secondary serving cell (e.g. SCell1), the UE may implicitly (or automatically) deactivate the secondary serving cell (S1610). For example, the UE may deactivate the SCell1 if the signal indicating the TAG re-assignment indicates a timing advance group TAG2 different from a timing advance group TAG1 previously assigned to the serving cell. In this case, the serving cell identifier of the signal may indicate the SCell1. The implicit deactivation of the secondary serving cell may be performed when the secondary serving cell is in an activation state. Alternatively, if the secondary serving cell (e.g. SCell1) is in a deactivation state, the UE may activate the secondary serving cell (e.g. SCell1) and initiate a random access procedure for timing advance maintenance. Alternatively, the UE may activate the secondary serving cell (e.g. SCell1) if the secondary serving cell (e.g. SCell1) is in a deactivation state, and may initiate a random access procedure if the UE receives a PDCCH along with the timing advance group assignment information. In case that a special TAG is pre-defined for the purpose of TAG re-assignment, the UE may implicitly (or automatically) deactivate the secondary serving cell (e.g. SCell1) when the TAG ID received from the eNB indicates the pre-defined TAG.

Then, the UE may re-assign the secondary serving cell to TAG2. Deactivation control in accordance with the present invention prevents inter-cell or intra-cell interferences caused by a wrong time alignment and alleviates additional signaling burden between the UE and the eNB.

Figure 17:
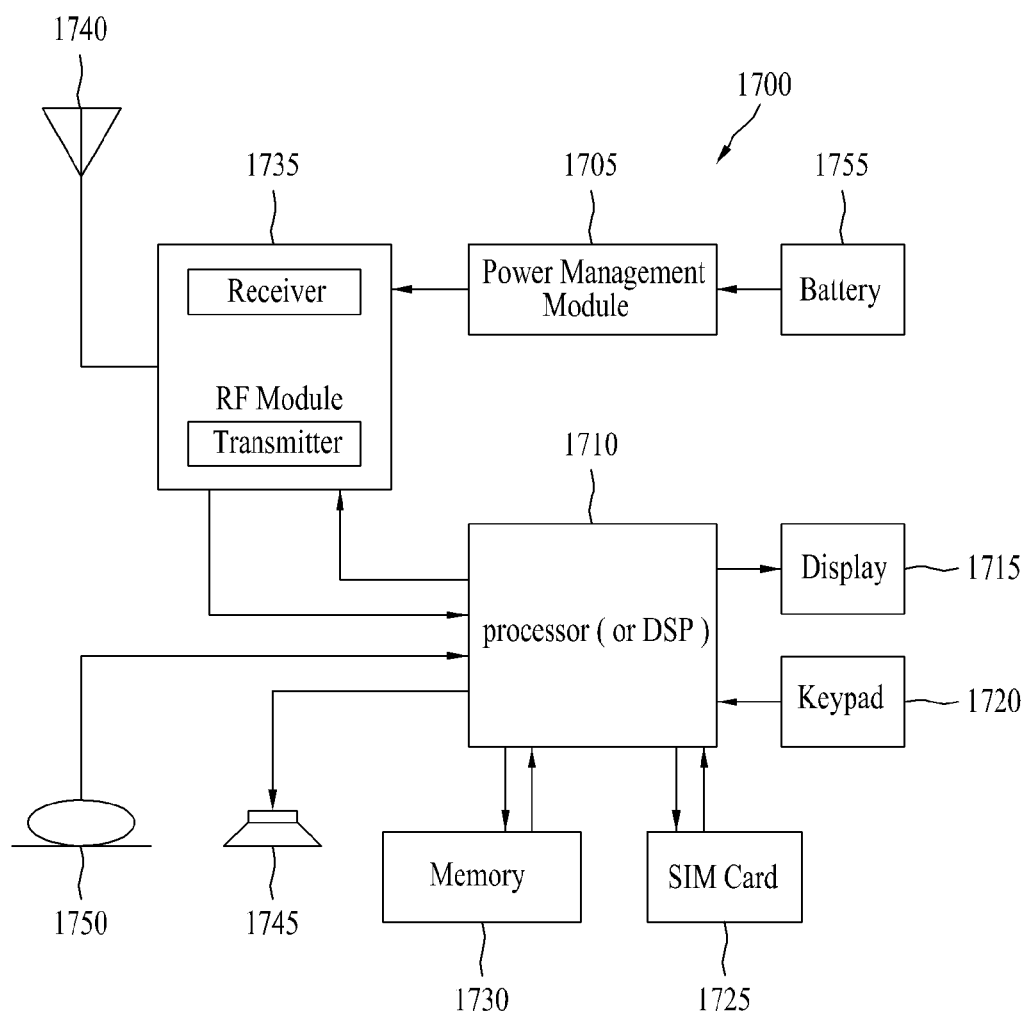
FIG. 17 illustrates an exemplary block diagram of an UE.

FIG. 17 illustrates a block diagram of an UE or Mobile Station (MS) 1700. The UE 1700 may include a MTC device or a delay-tolerant device. The UE 1700 may include at least one of a processor (or digital signal processor) 1710, RF module 1735, power management module 1705, antenna 1740, battery 1755, display 1715, keypad 1720, memory 1730, SIM card 1725 (which may be optional), speaker 1745 and microphone 1750. The processor 1710 may be a special purpose or general purpose processor, and may include microprocessor, microcontroller, digital signal processor, or the like. The memory 1730 may include random access memory (RAM), read-only memory (ROM), flash memory, programmable read only memory (PROM), erasable programmable read only memory (EPROM), electrically erasable and programmable ROM (EEPROM), hard disk drive, floppy disk drive, solid state drive, or the like.

A user enters instructional information, such as a telephone number, for example, by pushing the buttons of a keypad 1720 or by voice activation using the microphone 1750. The processor 1710 receives and processes the instructional information to perform the appropriate function, such as to dial the telephone number. Operational data may be retrieved from the Subscriber Identity Module (SIM) card 1725 or the memory module 1730 to perform the function. Furthermore, the processor 1710 may display the instructional and operational information on the display 1715 for the user's reference and convenience.

The processor 1710 issues instructional information to the RF module 1735, to initiate communication, for example, transmits radio signals comprising voice communication data. The RF module 1735 comprises a receiver and a transmitter to receive and transmit radio signals. An antenna 1740 facilitates the transmission and reception of radio signals. Upon receiving radio signals, the RF module 1735 may forward and convert the signals to baseband frequency for processing by the processor 1710. The processed signals would be transformed into audible or readable information outputted via the speaker 1745, for example. The processor 1710 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and an UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatus used for in a wireless communication system. The apparatus may include a user equipment, a base station, a relay, a repeater, and the like.

The invention claimed is:

1. A method of deactivating a serving cell at a user equipment in a mobile communication system, the method comprising:
  receiving, by the user equipment, a message from a base station, the message allocating the serving cell to a first timing advance group (TAG);
  receiving, by the user equipment, an activation command for the serving cell from the base station;
  activating, by the user equipment, the serving cell in accordance with the activation command;
  receiving, by the user equipment, a first signal from the base station, the first signal indicating a TAG re-assignment of the serving cell, wherein the first signal includes an identifier of the serving cell and an identifier of a second TAG;
  determining, by the user equipment, whether the second TAG is identical to a special TAG pre-defined for a purpose of TAG re-assignment or not; and
  deactivating, by the user equipment, the serving cell, only if the second TAG is identical to the pre-defined TAG.

2. The method of claim 1, wherein the first signal is received via radio resource control (RRC) signaling or medium access control (MAC) signaling.

3. The method of claim 1, wherein the serving cell is a secondary cell.

4. A user equipment (UE) deactivating a serving cell in a mobile communication system, the UE comprising:
  a radio frequency (RF) unit; and
  a processor, the processor configured to receive a message from a base station, the message allocating the serving cell to a first timing advance group (TAG);
  receive an activation command for the serving cell from the base station;
  activate the serving cell in accordance with the activation command, receive a first signal from the base station, the first signal indicating a TAG re-assignment of the serving cell, wherein the first signal includes an identifier of the serving cell and an identifier of a second TAG,
  determine whether the second TAG is identical to a special TAG pre-defined for a purpose of TAG re-assignment or not, and
  deactivate the serving cell, only if the second TAG is identical to the pre-defined TAG.

5. The UE of claim 4, wherein the first signal is received via radio resource control (RRC) signaling or medium access control (MAC) signaling.

6. The UE of claim 4, wherein the serving cell is a secondary cell.

* * * * *